United States Patent
Bruemmer et al.

(10) Patent No.: US 11,873,815 B2
(45) Date of Patent: Jan. 16, 2024

(54) VANE PUMP

(71) Applicant: Hella GmbH & Co. KGaA, Lippstadt (DE)

(72) Inventors: Sascha Bruemmer, Lippstadt (DE); Sebastian Gajda, Lippstadt (DE); Georg Goessmann, Moehnesee (DE); Theodor Hueser, Geseke (DE); Christian Koester, Warstein (DE); Dennis Marburg, Wadersloh (DE); Christian Praest, Langenberg (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 17/690,087

(22) Filed: Mar. 9, 2022

(65) Prior Publication Data
US 2022/0196014 A1 Jun. 23, 2022

Related U.S. Application Data

(63) Continuation of application No. PCT/EP2020/074436, filed on Sep. 2, 2020.

(30) Foreign Application Priority Data

Sep. 10, 2019 (DE) ..................... 10 2019 124 262.2

(51) Int. Cl.
*F03C 2/00* (2006.01)
*F03C 4/00* (2006.01)
(Continued)

(52) U.S. Cl.
CPC .......... *F04C 2/3446* (2013.01); *F04C 15/008* (2013.01); *F04C 15/0073* (2013.01);
(Continued)

(58) Field of Classification Search
CPC ................ F04C 2/3446; F04C 15/0073; F04C 15/008; F04C 18/3446; F04C 29/0074;
(Continued)

(56) References Cited

U.S. PATENT DOCUMENTS

| 4,021,166 A * | 5/1977 | Glanvall | ............... F04C 18/344 |
| | | | 418/236 |
| 5,145,348 A | 9/1992 | Zumbusch | |

(Continued)

FOREIGN PATENT DOCUMENTS

| DE | 102009055945 A1 | 6/2011 |
| DE | 102016121388 A1 | 5/2018 |

OTHER PUBLICATIONS

International Search Report dated Nov. 11, 2020 in corresponding application PCT/EP2020/074436.

*Primary Examiner* — Theresa Trieu
(74) *Attorney, Agent, or Firm* — Muncy, Geissler, Olds & Lowe , P.C.

(57) ABSTRACT

A vane pump having an electric drive unit with a drive shaft, a pump chamber, a rotor arranged in the pump chamber so as to rotate about a rotational axis, and a driver that has at least one driver pin and is connected in a rotationally fixed manner to the drive shaft, wherein, in an operating state of the vane pump, the driver pin, by way of a contact surface of the driver pin designed as a section of a lateral surface, engages in a torque-transmitting manner with a contact surface of the rotor delimiting a rotor recess designed to correspond to the driver pin. In order to improve a vane pump, it is proposed that the contact surface of the rotor is designed and arranged in such a manner that the rotational axis lies in the contact surface when this contact surface is hypothetically extended toward the rotational axis.

9 Claims, 6 Drawing Sheets

(51) Int. Cl.
  *F04C 2/00* (2006.01)
  *F04C 18/00* (2006.01)
  *F04C 2/344* (2006.01)
  *F04C 15/00* (2006.01)
  *F04C 18/344* (2006.01)
  *F04C 29/00* (2006.01)
  *F16D 1/08* (2006.01)

(52) U.S. Cl.
  CPC ...... *F04C 18/3446* (2013.01); *F04C 29/0071* (2013.01); *F04C 2240/20* (2013.01); *F16D 1/0876* (2013.01)

(58) Field of Classification Search
  CPC .............. F04C 2240/20; F04C 2240/60; F01C 21/0809; F16D 1/0876; F16D 3/205; F16D 3/2052
  See application file for complete search history.

(56) References Cited

U.S. PATENT DOCUMENTS

| | | | |
|---|---|---|---|
| 9,212,660 B2 | 12/2015 | Hueser et al. | |
| 2013/0052057 A1* | 2/2013 | Huser | F04C 15/0076 418/182 |

* cited by examiner

VANE PUMP

This nonprovisional application is a continuation of International Application No. PCT/EP2020/074436, which was filed on Sep. 2, 2020, and which claims priority to German Patent Application No. 10 2019 124 262.2, which was filed in Germany on Sep. 10, 2019, and which are both herein incorporated by reference.

BACKGROUND OF THE INVENTION

Field of the Invention

The present invention relates to a vane pump.

Description of the Background Art

Vane pumps are known from the prior art in numerous different embodiments. The known vane pumps comprise an electric drive unit with a drive shaft, a pump chamber, a rotor that has a number of vanes and is arranged in the pump chamber so as to rotate about a rotational axis, and a driver that has at least one driver pin and is connected in a rotationally fixed manner to the drive shaft, wherein, in an operating state of the vane pump, the driver pin, by way of a contact surface of the driver pin designed as a section of a lateral surface, engages in a torque-transmitting manner with a contact surface of the rotor delimiting a rotor recess (of the rotor) designed to correspond to the driver pin, and wherein the driver with the driver pin is designed as a sintered part and/or a cast part.

A vane pump is known, for example, from DE 10 2009 055 945 B4, which corresponds to US 2013/0052057, which is incorporated herein by reference.

SUMMARY OF THE INVENTION

It is therefore an object of the present invention to provide an improved vane pump.

This object is attained in an example, by a vane pump, which is characterized in that the contact surface of the rotor is designed and arranged in such a manner that the rotational axis lies in the contact surface when this contact surface is extended toward the rotational axis. The dependent claims relate to advantageous improvements of the invention.

An important advantage of the vane pump according to the invention resides, in particular, in that the rotor height wear is reduced so that, on the one hand, the vane pump according to the invention has a longer service life, which is to say operating time, in comparison with the prior art. On the other hand, because of the reduction in rotor height wear, proper operation of the vane pump over the entire operating time of the pump is possible at the same time. For example, the achievement of a predefined final vacuum in a vane pump implemented as a vacuum generator depends substantially on the aforementioned reduction in rotor height wear. Consequently, the torque transmission is substantially improved by the improved arrangement of the contact surfaces of the rotor of the vane pump according to the invention.

The contact surface of the driver pin can run essentially parallel to the rotational axis. In this way, the torque transmission is improved further and the rotor height wear is reduced further.

The contact surface of the driver pin can be designed as a section of a surface of a circular cylinder. As a result, the contact surface of the driver pin is designed in a way that is especially simple in terms of construction.

A demolding surface can extend at an incline in a longitudinal direction of the driver pin is formed on the driver pin on a side of the lateral surface of the driver pin facing away from the contact surface of the rotor. In this way, manufacture of the driver, and thus of the vane pump according to the invention, is simplified substantially.

Generally speaking, the design of the demolding surface can be freely selectable within broad suitable limits. An advantageous improvement of the aforementioned embodiment of the vane pump according to the invention provides that the demolding surface is designed such that it is reduced in the direction of a free end of the driver pin. As a result, manufacture of the driver, and thus of the vane pump according to the invention, is improved further.

At least half of the lateral surface of the driver pin in the cross-section of the driver pin can be designed as the contact surface of the driver pin. It is ensured in this way that the contact surface of the rotor always engages with the contact surface of the driver pin in the desired manner when the vane pump according to the invention is in the operating state.

The driver pin can have a circumferential reduction at its free end. Assembly of the vane pump according to the invention is facilitated as a result.

The rotor recess can be additionally delimited by a boundary surface of the rotor arranged opposite the contact surface of the rotor, wherein the boundary surface is designed to be substantially parallel to the contact surface. In this way, manufacture, for example, of the rotor recess, and thus manufacture of the vane pump according to the invention, is facilitated.

The rotor can have two rotor recesses and the driver can have two driver pins designed to correspond thereto, wherein the two rotor recesses are implemented opposite one another on the rotor in such a manner that, when the contact surfaces of the rotor delimiting the rotor recesses are hypothetically extended toward the rotational axis, these contact surfaces transition into one another with essentially no offset. As a result, the torque transmission from the drive shaft to the rotor by means of the driver is additionally improved.

The pump chamber and the rotor can be matched to one another in such a manner that the rotor self-adjusts as it rotates about the rotational axis in the operating state of the vane pump. In this way, it is ensured that the rotor automatically aligns itself relative to the pump chamber. Accordingly, wear and energy expenditure are additionally reduced with the vane pump according to the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
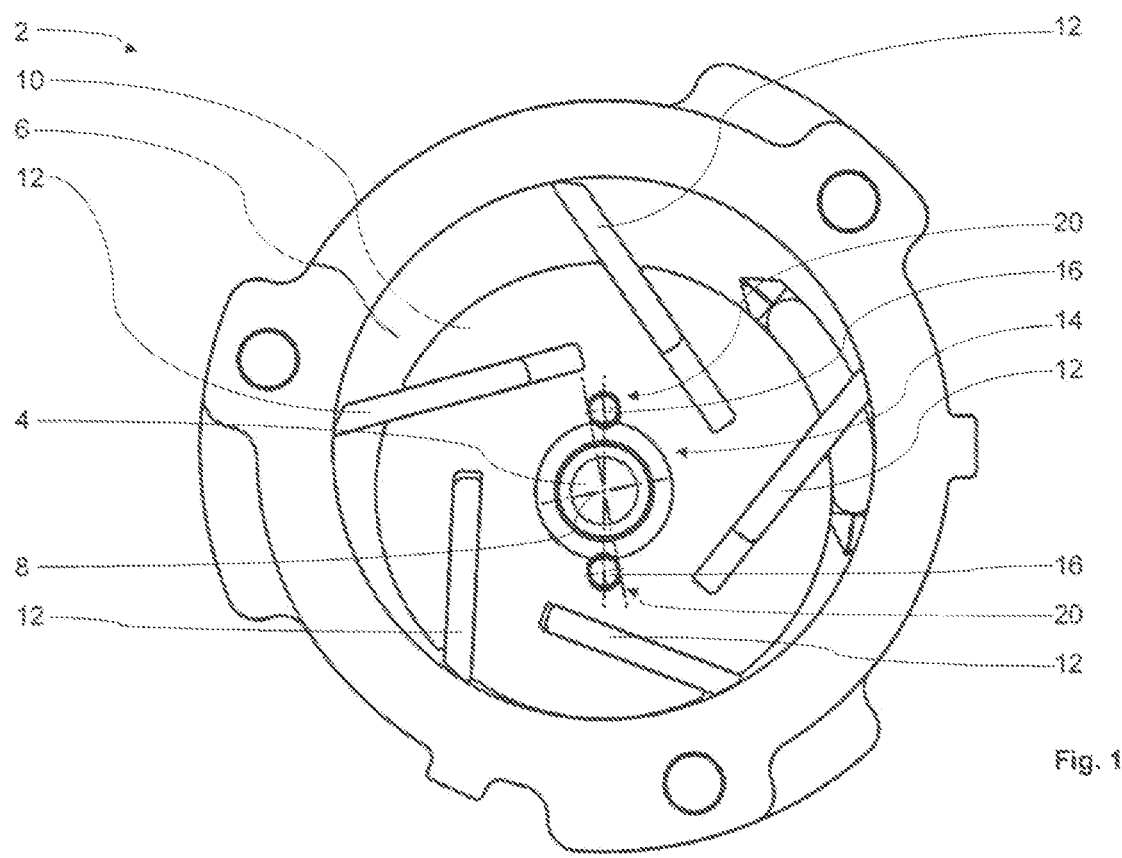
FIG. 1 shows an exemplary embodiment of the vane pump according to the invention in a partial top view.

An exemplary embodiment of the vane pump according to the invention is shown partially in each of FIGS. 1 to 4. The vane pump 2 is implemented as a vacuum pump for brake assistance in a vehicle implemented as a passenger car. The vane pump 2 includes, among other things, an electric drive unit—not shown in detail—with a drive shaft 4, a pump chamber 6, a rotor 10 that has a number of vanes 12 and is arranged in the pump chamber 6 so as to rotate about a rotational axis 8, and a driver 14 that has two driver pins 16 and is connected in a rotationally fixed manner to the drive shaft 4, wherein, in an operating state of the vane pump 2, the relevant driver pin 16, by way of a contact surface 18 of the driver pin 16 designed as a section of a lateral surface 17, engages in a torque-transmitting manner with a contact surface 22 of the rotor 10 delimiting a rotor recess 20 (of the rotor 10) designed to correspond to the relevant driver pin 16, and wherein the driver 14 with the driver pins 16 is designed as a sintered part. In the present exemplary embodiment, the driver 14 is produced by means of so-called metal injection molding, which is to say by means of powder injection molding. The driver pins 16 as well as the rotor recesses 20 of the rotor 10 that are designed to correspond thereto are designed analogously in each case.

The rotor 10 thus has two rotor recesses 20, and the driver 14 has two driver pins 16 designed to correspond thereto. The contact surfaces 22 of the rotor 10 are designed and arranged in such a manner that, when these contact surfaces 22 are hypothetically extended toward the rotational axis 8, the rotational axis 8 lies in the relevant contact surface 22 of the rotor 10. Accordingly, the two rotor recesses 20 are implemented opposite one another on the rotor 10 in such a manner that these contact surfaces 22 transition into one another with essentially no offset in the case of the aforementioned hypothetical extension of the contact surfaces 22 of the rotor 10 toward the rotational axis 8. In this regard, see reference line 23 in FIG. 2, in particular.

The contact surface 18 of the relevant driver pin 16 runs essentially parallel to the rotational axis 8, wherein certain component tolerances are unavoidable. Because of these unavoidable component tolerances, in the present exemplary embodiment the pump chamber 6 and the rotor 10 are matched to one another in such a manner that the rotor 10 self-adjusts as it rotates about the rotational axis 8 in the operating state of the vane pump 2. Furthermore, the contact surface 18 of the relevant driver pin 16 is designed as a section of a surface of a circular cylinder.

As already explained above, the driver 14 with the two driver pins 16 is manufactured by means of powder injection molding. Accordingly, provision is made that the driver pins 16 of the driver 14 each have a draft. For this reason, it is the case in the present exemplary embodiment that a demolding surface 24 extending at an incline in a longitudinal direction of the driver pin 16 is formed on the driver pin 16 on a side of the lateral surface 17 of the relevant driver pin 16 of the driver 14 facing away from the relevant contact surface 22 of the rotor 10. The demolding surface 24 of the relevant driver pin 16 of the driver 14 is designed such that it is reduced in the direction of a free end of this driver pin 16. The longitudinal direction of the relevant driver pin 16 of the driver 14 is perpendicular to the image planes of FIGS. 1 and 2.

In order to ensure a desired seating of the contact surfaces 18 of the driver pins 16 of the driver 14 on the correspondingly designed contact surfaces 22 of the rotor 10 in the operating state of the vane pump 2, at least half of the lateral surface 17 of the relevant driver pin 16 in the cross-section of the relevant driver pin 16 is additionally designed as the contact surface 18 of this driver pin 16.

For easier assembly of the vane pump 2, the relevant driver pin 16 of the driver 14 has a circumferential reduction 26 at its free end.

Figure 2:
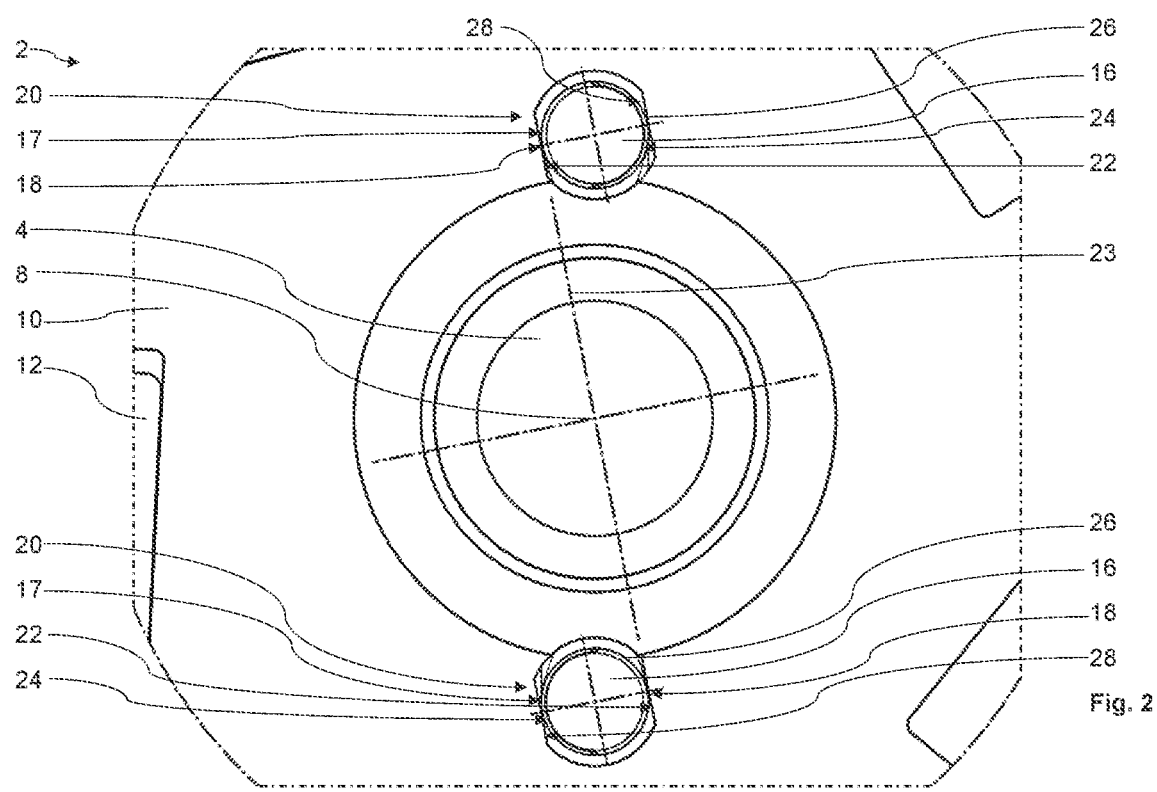
FIG. 2 is the top view from FIG. 1 in an enlarged representation in the region of the driver pins.
Figure 3:
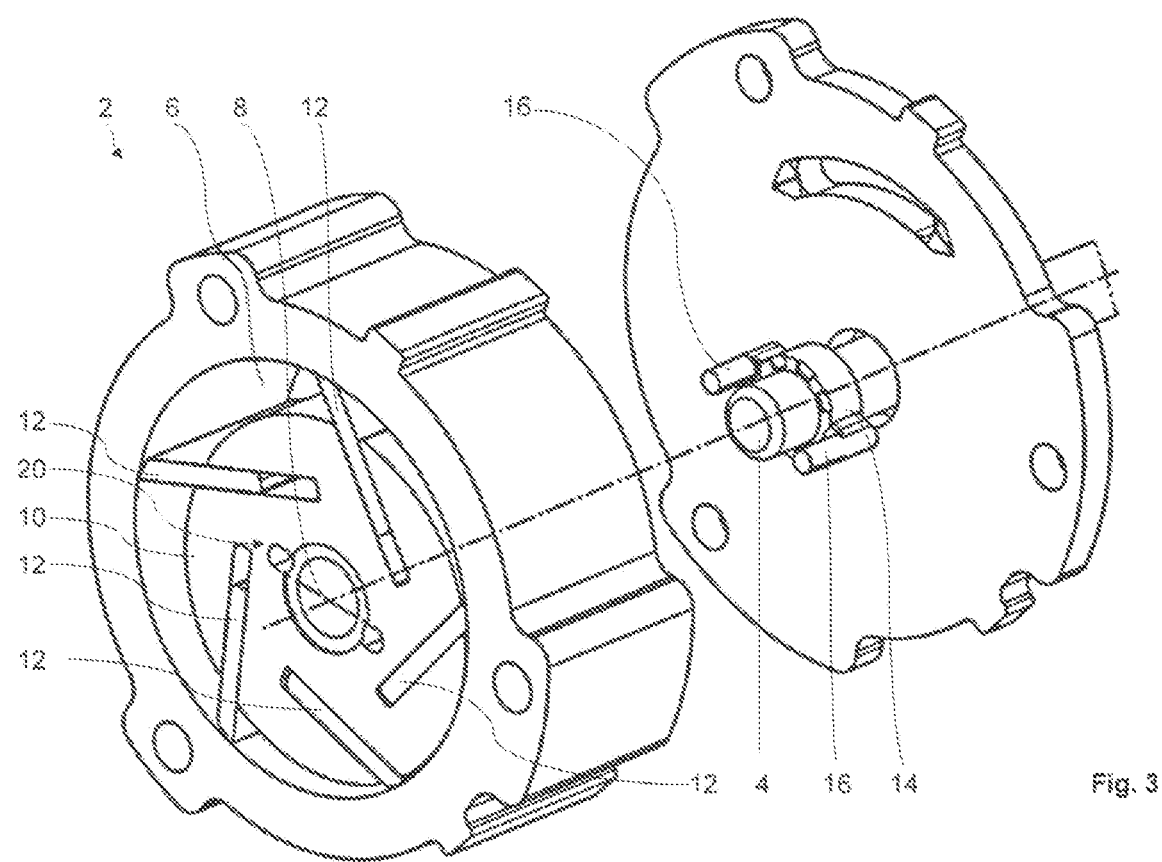
FIG. 3 shows the exemplary embodiment in a partial exploded representation.
Figure 4:
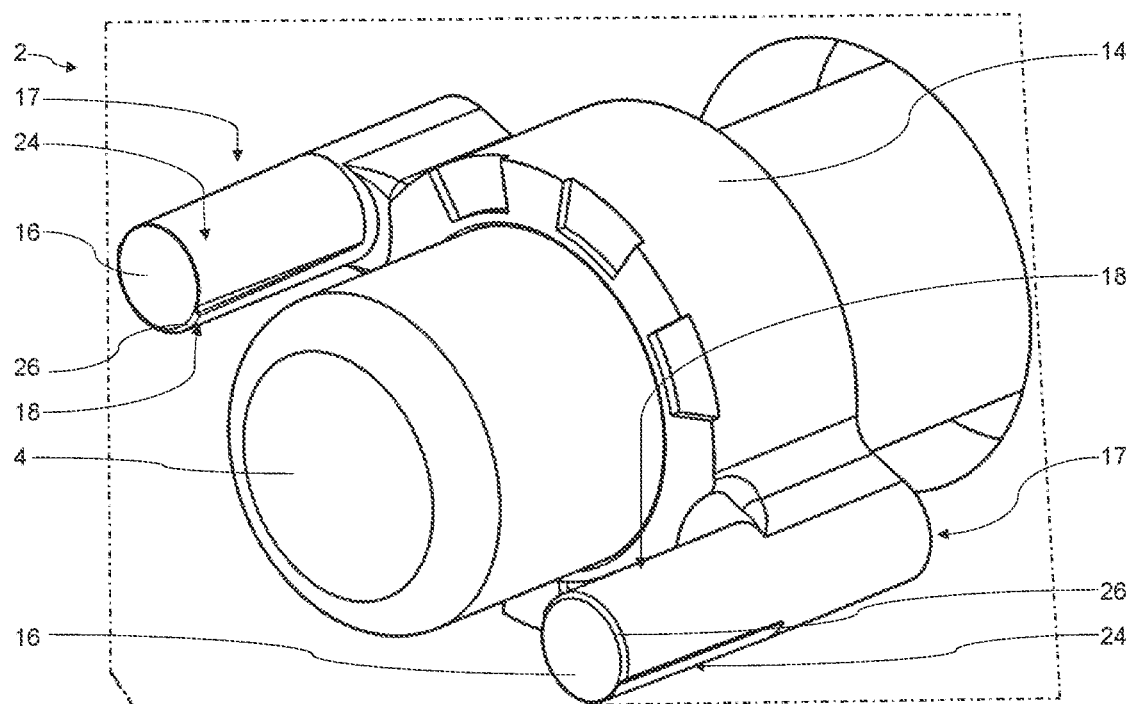
FIG. 4 shows a driver from the exemplary embodiment in a perspective representation.

As is evident from FIG. 2, in particular, the relevant rotor recess 20 of the rotor 10 is additionally delimited by a boundary surface 28 of the rotor 10 arranged opposite the relevant contact surface 22 of the rotor 10, wherein the boundary surface 28 is designed to be substantially parallel to the contact surface 22. In FIG. 2, the top view from FIG. 1 is shown enlarged in the region of the driver 14 for easier orientation. FIG. 3 shows the vane pump 2 in a partial exploded representation for better understanding of how the vane pump 2 is assembled and how the driver 14 interacts with the rotor 10. The details of the construction of the driver pins 16 of the driver 14 are evident from FIG. 4.

The mode of operation of the vane pump according to the invention is explained below in detail in accordance with the present exemplary embodiment and on the basis of FIGS. 1 to 4.

As soon as the vane pump 2 implemented as a vacuum pump for brake assistance in a passenger car has been placed in its operating state, the drive shaft 4 of the drive unit rotates counterclockwise about the rotational axis 8 in the image plane of FIG. 1. Since the driver 14 is arranged in a rotationally fixed manner on the drive shaft 4, the driver 14 likewise rotates counterclockwise about the rotational axis 8. In so doing, the two driver pins 16 of the driver 14 engage with the correspondingly designed rotor recesses 20 of the rotor 10. The relevant contact surface 18 of the driver pins 16 rests against the respective corresponding contact surface 22 of the rotor 10. The torque introduced by means of the drive shaft 4 is therefore transmitted to the rotor 10 by means of the driver 14 with its driver pins 16 and the contact surfaces 18 on the one side and the contact surfaces 22 of the rotor 10 delimiting the rotor recesses 20 of the rotor 10 on the other side.

Accordingly, the rotor 10 likewise rotates counterclockwise about the rotational axis 8 in the image plane of FIG. 1. In this process, the vanes 12 resiliently mounted in the rotor 10 slip at their free ends on the pump chamber 6 in a manner known to the person skilled in the art.

When force transmission occurs between the contact surfaces 18 of the driver pins 16 on the one side and the contact surfaces 22 of the rotor 10 delimiting the rotor recesses 20 of the rotor 10, it is ensured on account of the above-described embodiment of the vane pump 2 that the seating of the contact surfaces 18 of the driver pins 16 of the driver 14 on the respective corresponding contact surface 22 of the rotor 10 takes place in the desired manner solely in the region of the contact surfaces 18 of the driver pins 16 and not in the region of the relevant demolding surface 24 of the driver pins 16 of the driver 14. As a result, the rotor height wear of the rotor 10 is reduced on the one hand. In FIGS. 1 and 2, the rotor height is perpendicular to the relevant image plane. On the other hand, the achievement of a predefined final vacuum for which the vane pump 2 has been designed is ensured permanently, which is to say over the entire operating time of the vane pump 2, by this means.

Because the pump chamber 6 and the rotor 10 are matched to one another in such a manner that the rotor 10 self-adjusts as it rotates about the rotational axis 8 in the operating state of the vane pump 2, the torque transmission from the drive shaft 4 to the rotor 10 by means of the driver 14 is additionally improved.

Figure 5:
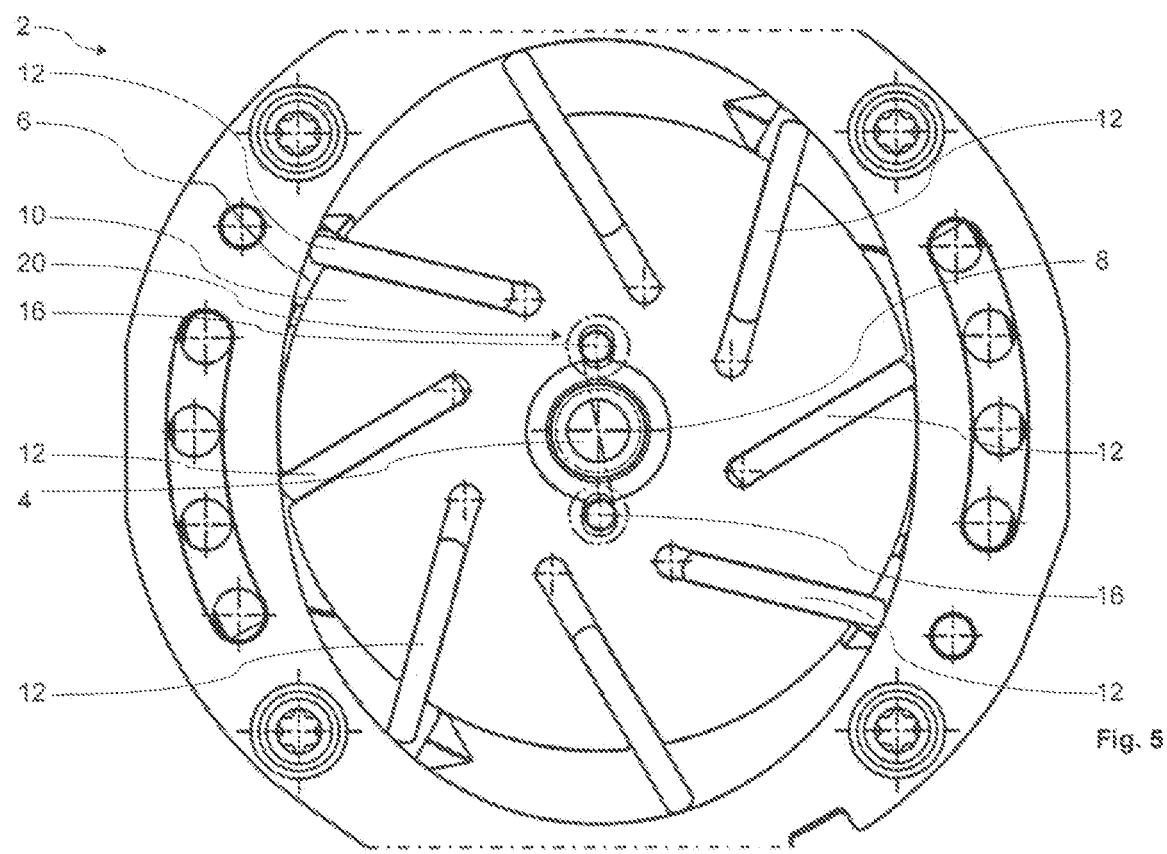
FIG. 5 shows an exemplary embodiment of the vane pump according to the invention in a partial top view.
Figure 6:
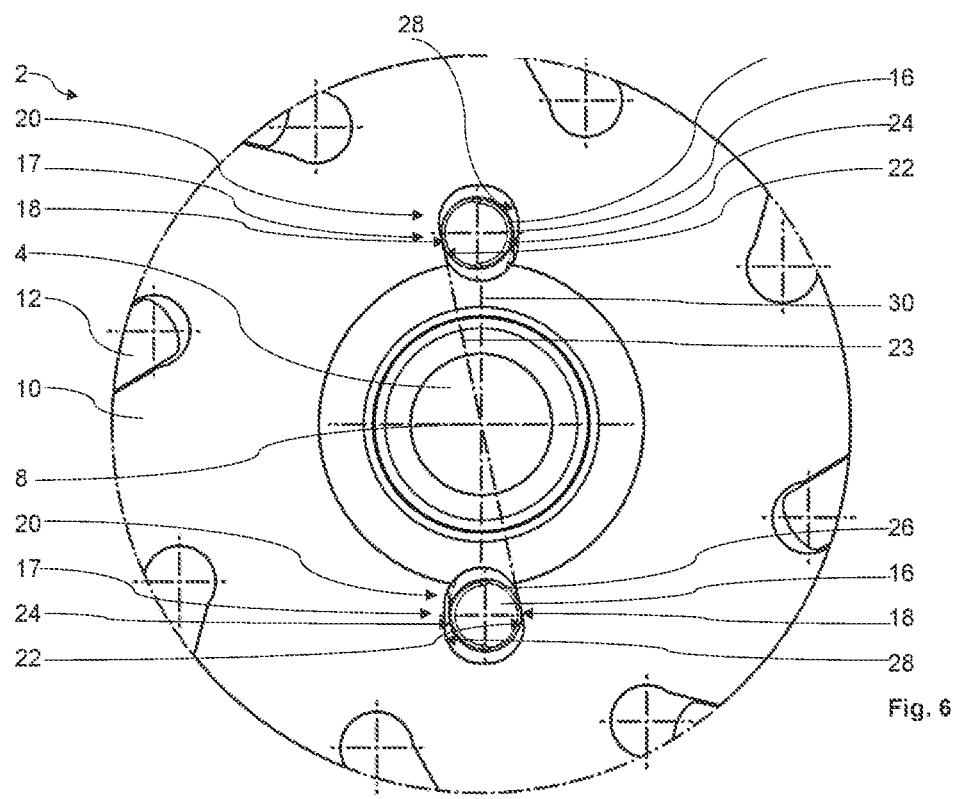
FIG. 6 is a top view from FIG. 5 in an enlarged representation in the region of the driver pins.

A second exemplary embodiment of the vane pump according to the invention is partially shown in FIGS. 5 and 6. Components that are the same or have the same functions are labeled with the same reference symbols as in the first exemplary embodiment. Furthermore, the second exemplary embodiment is only explained with regard to the differences from the first exemplary embodiment. Otherwise, the reader is referred to the above remarks concerning the first exemplary embodiment.

FIGS. 5 and 6 of the second exemplary embodiment correspond to FIGS. 1 and 2 of the first exemplary embodiment. As is evident when FIGS. 1, 2 and 5, 6 are viewed as a whole, the first and the second exemplary embodiments correspond in the essential features. In the second embodiment, as well, the relevant rotor recess 20 is delimited by the corresponding contact surface 22 of the rotor 10 and additionally by a boundary surface 28 of the rotor 10 arranged opposite each contact surface 22. In contrast to the first exemplary embodiment, this boundary surface 28 is not designed to be parallel to the corresponding contact surface 22 of the rotor 10. Instead, the boundary surfaces 28 of the rotor 10 each run parallel to a reference line 30 intersecting the rotational axis 8. In this regard, see FIG. 6, in particular.

The invention is not limited to the present exemplary embodiments. For example, the vane pump according to the invention can be used advantageously for a multiplicity of applications and areas of use. Accordingly, the above-described use as a vacuum pump for brake assistance in passenger cars is strictly exemplary. Furthermore, the invention is not limited to the exact configuration of the vane pump in accordance with the present exemplary embodiments. Instead of two driver pins, drivers with only a single driver pin or with more than two driver pins are also possible. Accordingly, embodiments with only a single rotor recess or with more than two rotor recesses are also possible.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A vane pump comprising:
    an electric drive unit with a drive shaft;
    a pump chamber;
    a rotor that has at least two vanes and is arranged in the pump chamber so as to rotate about a rotational axis; and
    a driver that has at least one driver pin and is connected in a rotationally fixed manner to the drive shaft,
    wherein, in an operating state of the vane pump, the driver pin, via a contact surface of the driver pin formed as a section of a lateral surface, engages in a torque-transmitting manner with a contact surface of the rotor delimiting a rotor recess of the rotor that corresponds to the driver pin,
    wherein the driver with the driver pin is at least one of a sintered part and/or or a cast part,
    wherein the contact surface of the rotor is arranged such that the rotational axis lies in the contact surface of the rotor when the contact surface of the rotor is hypothetically extended toward the rotational axis, and
    wherein a demolding surface extending at an incline in a longitudinal direction of the driver pin is formed on the driver pin on a side of the lateral surface of the driver pin facing away from the contact surface of the rotor.

2. The vane pump according to claim 1, wherein the contact surface of the driver pin runs essentially parallel to the rotational axis.

3. The vane pump according to claim 2, wherein the contact surface of the driver pin is formed as a section of a surface of a circular cylinder.

4. The vane pump according to claim 1, wherein the demolding surface is reduced in a direction of a free end of the driver pin.

5. The vane pump according to claim 1, wherein at least half of the lateral surface of the driver pin in the cross-section of the driver pin is formed as the contact surface of the driver pin.

6. The vane pump according to claim 1, wherein the driver pin has a circumferential reduction at a free end.

7. The vane pump according to claim 1, wherein the rotor recess is additionally delimited by a boundary surface of the rotor arranged opposite the contact surface of the rotor, wherein the boundary surface of the rotor is formed to be substantially parallel to this the contact surface of the rotor.

8. The vane pump according to claim 1, wherein the rotor has two rotor recesses and the driver has two driver pins to that correspond thereto, wherein the two rotor recesses are implemented opposite one another on the rotor such that, when the contact surfaces of the rotor delimiting the rotor recesses are hypothetically extended toward the rotational axis, these contact surfaces transition into one another with essentially no offset.

9. The vane pump according to claim 1, wherein the pump chamber and the rotor are matched to one another in such a manner that the rotor self-adjusts as the rotor rotates about the rotational axis in the operating state of the vane pump.

* * * * *